(12) United States Patent
Kramer et al.

(10) Patent No.: US 11,595,780 B2
(45) Date of Patent: Feb. 28, 2023

(54) SYSTEM AND METHOD FOR PROVIDING AN IMMERSIVE DRIVE-IN EXPERIENCE

(71) Applicant: Harman International Industries, Incorporated, Stamford, CT (US)

(72) Inventors: Kyle David Kramer, Waterford, MI (US); Maxwell B. Willis, Detroit, MI (US); Christopher Michael Trestain, Livonia, MI (US); Chris Ludwig, Bloomfield Hills, MI (US); Riley Winton, Opelika, AL (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/396,109

(22) Filed: Aug. 6, 2021

(65) Prior Publication Data
US 2022/0046379 A1  Feb. 10, 2022

Related U.S. Application Data

(60) Provisional application No. 63/062,959, filed on Aug. 7, 2020.

(51) Int. Cl.
*H04W 4/021* (2018.01)
*G06F 3/16* (2006.01)
*H04W 4/80* (2018.01)
*H04W 4/44* (2018.01)

(52) U.S. Cl.
CPC ........... *H04W 4/021* (2013.01); *G06F 3/162* (2013.01); *G06F 3/165* (2013.01); *H04W 4/44* (2018.02); *H04W 4/80* (2018.02)

(58) Field of Classification Search
CPC ......... H04W 4/021; H04W 4/44; H04W 4/80; G06F 3/162
USPC ....................................................... 455/3.06
See application file for complete search history.

(56) References Cited

U.S. PATENT DOCUMENTS

| | | | |
|---|---|---|---|
| 7,406,214 B2 * | 7/2008 | Rhoads | G06Q 30/06 455/3.06 |
| 7,760,905 B2 * | 7/2010 | Rhoads | G06F 3/017 455/3.06 |
| 8,068,105 B1 * | 11/2011 | Classen | H04S 7/40 345/440 |
| 8,325,944 B1 * | 12/2012 | Duwenhorst | H04R 3/00 381/119 |
| 9,604,651 B1 * | 3/2017 | Amireddy | H04L 12/4625 |
| 10,324,683 B2 * | 6/2019 | Winton | G06F 3/04847 |
| 2004/0264704 A1 * | 12/2004 | Huin | H04S 7/301 381/59 |
| 2006/0066629 A1 * | 3/2006 | Norlander | G06Q 30/02 345/594 |

(Continued)

*Primary Examiner* — April G Gonzales
(74) *Attorney, Agent, or Firm* — Brooks Kushman P.C.

(57) ABSTRACT

In at least one embodiment, a system for providing an immersive audio experience at an entertainment venue is provided. The system includes at least one loudspeaker and a server. The at least one loudspeaker is attached to the entertainment venue. The server is associated with the entertainment venue and is programmed to communicate with a mobile device associated with a vehicle occupant and to enable access to the at least one loudspeaker to position the at least one loudspeaker in a vehicle in response to the mobile device being authenticated with the server.

17 Claims, 3 Drawing Sheets

(56) References Cited

U.S. PATENT DOCUMENTS

| | | | |
|---|---|---|---|
| 2013/0002802 A1* | 1/2013 | Mock | G06F 3/04883 |
| | | | 348/E7.083 |
| 2014/0229840 A1* | 8/2014 | Wardenaar | H04N 21/4532 |
| | | | 715/736 |
| 2015/0334505 A1* | 11/2015 | Crutchfield | G06F 3/165 |
| | | | 381/17 |
| 2016/0286328 A1* | 9/2016 | Li | H04R 29/008 |
| 2017/0094437 A1* | 3/2017 | Kadri | H04S 7/301 |
| 2017/0166056 A1* | 6/2017 | Buttolo | B60K 37/06 |

\* cited by examiner

SYSTEM AND METHOD FOR PROVIDING AN IMMERSIVE DRIVE-IN EXPERIENCE

CROSS-REFERENCE TO RELATED APPLICATIONS

This application claims the benefit of U.S. provisional application Ser. No. 63/062,959 filed Aug. 7, 2020, the disclosure of which is hereby incorporated in its entirety by reference herein.

TECHNICAL FIELD

Aspects disclosed herein generally relate to a system and method for providing an immersive drive-in experience. For example, the immersive drive-in experience may be a system that incorporates technologies that equip a vehicle parking space (or other location where a vehicle may reside) with a plurality of loudspeakers that may be positioned in a vehicle. Merged with other multimedia deployed in the space, the disclosed system and method provides, inter alia, high quality audio, interactive media, and a personalized audio experience.

BACKGROUND

Current movie "drive-in" formats have poor audio quality and have not explored the interactive possibilities of a parking space. Users receive audio at a show either by a single speaker that is hung from a vehicle window, or through AM/FM radio transmissions which results in a low-quality experience. The overall listening experience for vehicle occupants in a parked vehicle at a drive in is limited.

SUMMARY

In at least one embodiment, a system for providing an immersive audio experience at an entertainment venue is provided. The system includes at least one loudspeaker and a server. The at least one loudspeaker is attached to the entertainment venue. The server is associated with the entertainment venue and is programmed to communicate with a mobile device associated with a vehicle occupant and to enable access to the at least one loudspeaker to position the at least one loudspeaker in a vehicle in response to the mobile device being authenticated with the server.

In at least another embodiment, a system for providing an immersive audio experience at an entertainment venue is provided. The system includes a first loudspeaker, a second loudspeaker, and a server. The first loudspeaker and the second loudspeaker are attached to the entertainment venue. The server is associated with the entertainment venue and is programmed to communicate with a mobile device associated with a vehicle occupant and to enable access to the first loudspeaker and to the second loudspeaker to position the first loudspeaker and the second loudspeaker in a vehicle in response to the mobile device being authenticated with the server.

In at least another embodiment, a system for providing an immersive audio experience at an entertainment venue is provided. The system includes a server, at least one loudspeaker, and a mobile device. The server is associated with the entertainment venue. The at least one loudspeaker is positioned in vehicle. The mobile device is associated with an occupant of the vehicle and is programmed to interface with the server to enable audio from a performance at the entertainment venue to be transmitted and played back via the at least one loudspeaker in the vehicle after the server authenticates the mobile device.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
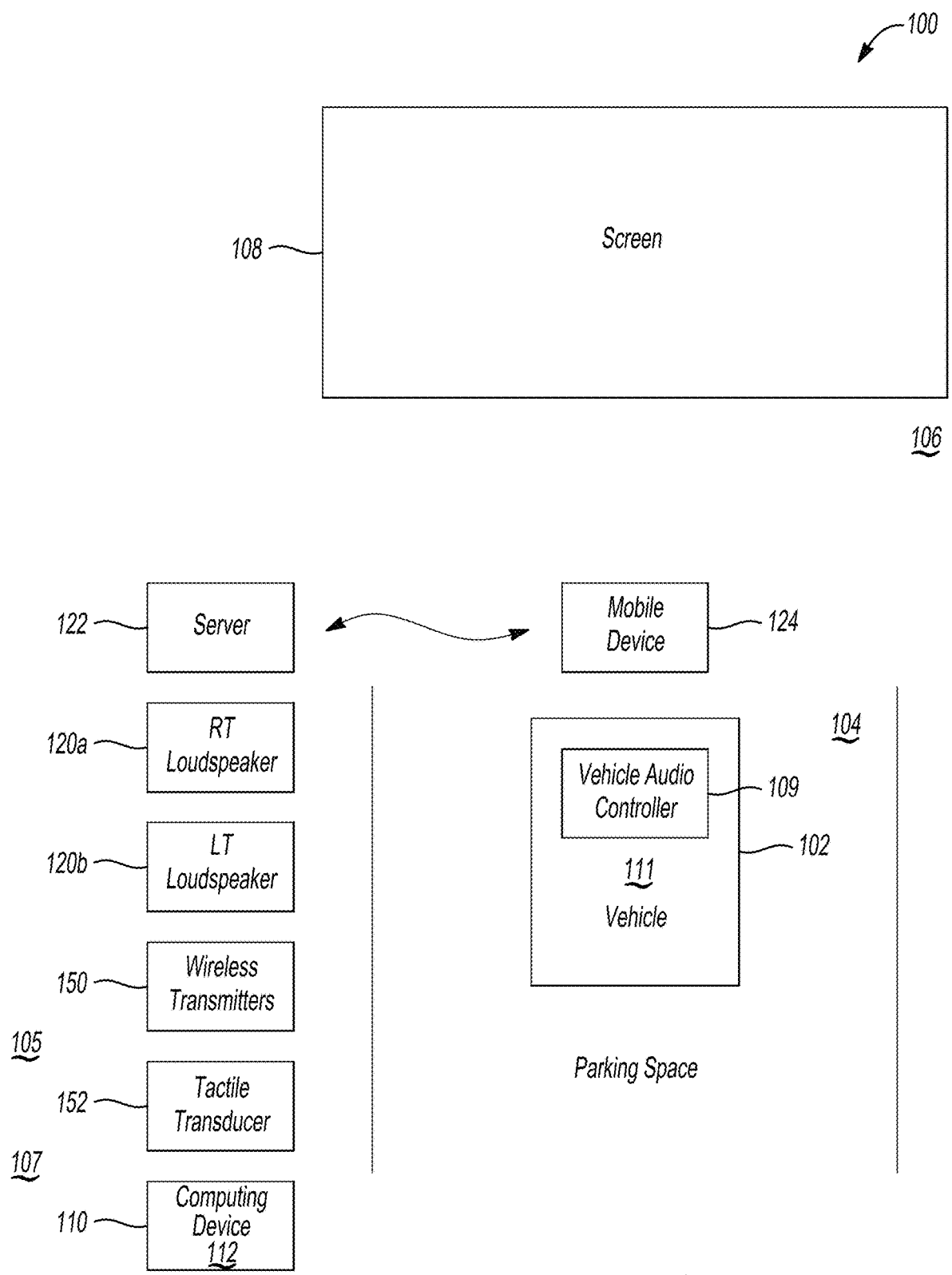
FIG. 1 depicts a system that provides an immersive drive-in experience (IDE) for one or more occupants in a vehicle in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based outputs and inputs for transmitting and receiving data, respectively to and from other hardware-based devices as discussed herein.

The Immersive Drive-In Experience (IDE) as set forth herein brings, among other things, a premium and interactive listening experience to a drive-in setting (e.g., movie, concert, etc.) by utilizing two or more channels of audio that are played through multiple speakers inside and outside the vehicle. In addition, the disclosed IDE system provides superior technology to current methods of a single speaker hanging on the driver-side window, or AM/FM radio transmission. In one example, the IDE may be demonstrated as a parking space with, for example, two speakers receiving audio from a drive-in media source, where each loudspeaker is stored on either side of the space, then picked up by the user and placed inside their vehicle on the far left and right of a vehicle's dashboard (or instrument panel) to form a high-quality stereo image for listening. It is recognized that any number of loudspeakers may be positioned around the space.

The IDE may complement an entertainment event that is suitable to be viewed from vehicles, such as a drive-in movie, live concert, or other multimedia/performance setting. The user may park their vehicle in a designated IDE space, and gain access to the space's hardware and software using an authentication server process to a mobile device. Once authenticated (or paired), the user may place the loudspeakers or other hardware stored outside of the vehicle and positioned exterior to the driver and passenger sides, inside the vehicle in the instructed locations, such as on the far left and right of the instrument panel.

The user then begins a personalization process by entering data such as listening preferences, vehicle make/model, and other metrics to enhance the experience. Users may control aspects of the parking space with interactive methods such as a mobile app, vehicle head unit, voice control, intercom, other hardware controls, or gesture recognition. These aspects include, but are not limited to, digital signal processing of the audio, lighting control, or interaction with the exterior content, be it a screen, live band or other people. The data that is being sent to and received from the hardware includes a direct stereo audio path from the media source, and additional audio channels or signal flows, and may correspond with a central server. Other loudspeakers and hardware may be deployed around the space to provide additional immersive technologies.

After authentication of the user to the drive-in establishment (e.g., server), hardware placement and personalization are complete, and users are ready to enjoy a high-quality listening and interactive experience at the drive-in. Currently, drive-in listening experiences leave room for modern adaptations. The IDE aims to fully utilize the potential of the parking space for high quality multichannel audio playback, and other interactive possibilities.

FIG. 1 depicts a system 100 that provides the IDE for one or more occupants in a vehicle 102. A vehicle 102 is generally shown that is parked in a parking space 104 of an entertainment venue 106, such as for example, but not limited to, a drive-in theatre. As is generally known, a large projection screen 108 is provided for displaying a movie, film, video data, etc. It is recognized that while the system 100 is illustrated in reference to a drive-in movie theater, aspects disclosed herein may be extended to concerts, theatrical plays, or any outdoor gathering that enables vehicles to gather and view such events.

A first loudspeaker 120a and a second loudspeaker 120b may be attached or tethered to a non-removable object (not shown) that is positioned adjacent to the parking space 104. The first loudspeaker 120a and the second loudspeaker 120b may be stowed in at least one protective housing 105 (hereafter "protective housing 105") that is positioned adjacent to the parking spot 104. It is recognized that the first and second loudspeakers 120a and 120b may be attached to the housing 105. The first loudspeaker 102a and the second loudspeaker 102b may retract (or be decoupled) from the housing 105 for placement in the vehicle 102. In another example, the first loudspeaker 120a and the second loudspeaker 120b may be returned (or attached) to the housing 105 when no longer in use. It is contemplated that one housing 105 may be positioned on a right of the vehicle 102 to house the first loudspeaker 120a and another housing 105 may be positioned on a left side of the vehicle 102 to house the second loudspeaker 120b to the entertainment venue 106. In one example, the first loudspeaker 120a may be a left loudspeaker and the second loudspeaker 120b may be a right loudspeaker for purposes of providing audio in a stereo format in the vehicle 102. In general, a vehicle occupant (not shown) may position the tethered first loudspeaker 120a and the second loudspeaker 120b on a top surface of the instrument panel (not shown) (or any other suitable surface) of the vehicle 102 to stream audio for the movie, concert, play, etc. In general, by establishing the first loudspeaker 120a as a left loudspeaker (or left channel) and the second loudspeaker 120b as a right loudspeaker (or right channel), this aspect enables such loudspeakers 120a, 120b to provide a high-quality stereo image to enhance the listening experience for the vehicle occupants.

Prior to utilizing the first and the second loudspeakers 120a, 120b; the vehicle 102 (i.e., the vehicle occupant(s)) is required to authenticate (or pair) itself to the entertainment venue 106. For example, a server 122 that is associated with the theater 106 may communicate with any one or more mobile devices 124 that belong to at least one vehicle occupant in the vehicle 102. The vehicle occupant may execute an application on the mobile device 124 that interfaces with the server 122 for purchasing admission to the movie, play, concert, etc. In response to the vehicle occupant purchasing one or more tickets via interface with the server 122, the server 122 may issue a passcode or QR code (or any other identifier that is indicative of a successful purchase) to the mobile device 124 of the vehicle occupant. The vehicle occupant may use the passcode, QR code, or electronic identifier to gain access to the first and second loudspeakers 120a, 120b. A computing device 110 that includes a scanner 112 may be operably coupled to the server 122 and scan the passcode or QR code (or electronic identifier) positioned as displayed on the user's mobile device 124 to fully authenticate the user to the server 122. For example, the computing device 110 may transmit a signal indicative of the captured image of the electronic identifier to the server 122. The server 122 may then compare the captured image to the electronic identifier that was sent to the mobile device 124. If a match is determined, the server 122 is authenticated with the mobile device 124, or the server 122 is paired with the mobile device 124. In response to receiving the authorized passcode, QR code, or electronic identifier, the server 122 may send a control signal to a power supply (not shown) in the housing 105. The power supply activates an actuator (not shown) in the housing 105 to unlock a lock 107 positioned on each corresponding housing 105. In this case, after the housing 105 unlocks, the user will have access to the first loudspeaker 120a and/or the second loudspeaker 120b.

After authentication, vehicle occupants may also utilize the app, which provides a user interface on the mobile device 124, to control various audio properties for the audio playback while the movie, play, or concert occurs. For example, the vehicle occupants may control volume, equalization or any other number of audio related properties via the mobile device 124. In addition, various controls may be captured via gesture or voice control via the mobile device 124. In this instance, the vehicle occupant may not want to take his/her eyes off the screen and provide voice commands to the mobile device 124 to interface with the server 122 which then controls the audio properties of the audio playback provided by the first loudspeaker 120a and the second loudspeaker 120b. Similarly, the mobile device 124 is equipped with an image capture device that may be used to capture gestures provided by the vehicle occupant which serve as indicia of control mechanisms. For example, the vehicle occupant may point the mobile device 124 at the occupant's hands to capture a hand wave that moves in an upward direction to the server 122 as a command to increase volume for the audio playback. Alternatively, in another example, the vehicle occupant may capture a hand wave that moves in a downward direction to serve as a command to decrease volume for the audio playback. In these instances, the mobile device 124 translates such gestures and transmits commands indicative of the gestures to the server 122 which in turn controls the audio properties accordingly. Aspects that allow image capture detection or gesture control may involve millimeter wave radar detection, infra-red, proximity detection, etc.

In another embodiment, the mobile device 124 may interface with the server 122 and receive the audio input from one or more wireless transmitters 150) positioned about the parking spot 104 after the mobile device 124 has been authenticated with the server 122. In this case, after the occupant has purchased an electronic ticket to the movie, concert, or show, etc. The occupant may display the QR code or other electronic identifier to the scanner 112 on the computing device 110 positioned proximate to the parking space 104 that indicates that the occupant has successfully purchased one or more tickets. Additionally, or alternatively, the occupant may simply enter a code into their respective mobile device 124 which is transmitted to the server 122. In response to receiving the code, the server 122 may then control the one or more wireless transmitters 150 to transmit the audio therefrom to the mobile device 124 or to a vehicle audio controller 109 positioned in the vehicle 102. In this instance, the occupant may control the various audio related parameters either through the user interface positioned on the mobile device 124 or directly via through the vehicle audio controller 109 of the vehicle 102. The vehicle audio controller 109 may transmit the audio via loudspeakers 111 that are equipped by the vehicle 102. It is recognized the transmitters 150 may corresponding to an internet link that is provided and accessed on the mobile device 124. For example, after authentication, the user may select a link provided on the mobile device 124 to have the audio played with through the mobile device 124 or through the loudspeakers 111 via the vehicle audio controller 109.

The parking space 104 may also be equipped with tactile based transducers 152 for generating low frequency signals which provide vibrations/sensations that increase the listening experience and simulate an indoor movie going experience. The output range of the tactile transducers 152 may also be controlled via the user interface positioned on the mobile device 124. The server 122 may enable the tactile transducers 152 to provide the low frequency signals after the mobile device 124 has been authenticated with the server 122. The manner in which access may be obtained to the tactile based transducers 152 may be performed similarly to that described in connection with the first and second loudspeakers 120a, 120b (e.g., actuator, housing 105, and lock 107).

Figure 2:
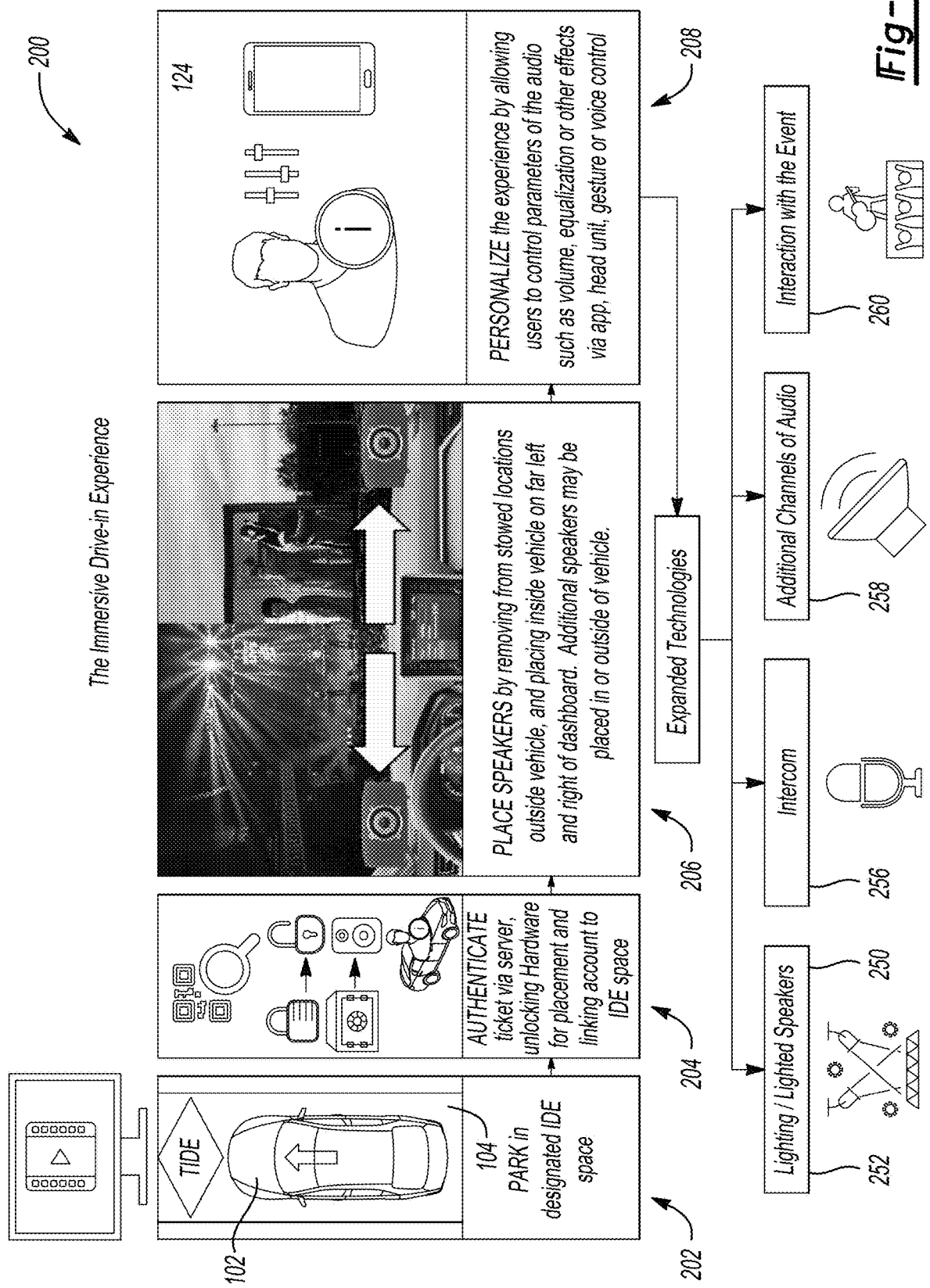
FIG. 2 depicts a flow diagram that provides the IDE for one or more occupants in the vehicle in accordance with one embodiment.

FIG. 2 depicts a flow diagram 200 that provides IDE for one or more occupants in a vehicle in accordance with one embodiment.

At 202, the vehicle 102 is parked at the parking space 104 of the drive-in movie theater 106.

At 204, the server 122 associated with the drive-in movie theater 106 and the mobile device 124 associated with the vehicle 102 undergo an authentication process. In this case, the mobile device 124 may exchange currency with the server 122 via an electronic transfer such that the occupant who has control over the mobile device 124 can gain entry into the theater 106 and ultimately unlock the first and the second loudspeakers 120a, 120b for use to playback audio for the movie, concert, play, etc. In one example, the mobile device 124 may display a QR code after the purchase has been performed. The scanner 112 of the computing device 110 or other suitable device may read the QR code an unlock the first and the second loudspeakers 120a, 120b so that such loudspeakers 120a, 120b may be removed from the housing. In another example, the occupant may simply input a password or other electronic identifier that is transmitted to the server 122 after the purchase. The server 122 may then unlock the first and the second loudspeakers 120a, 120b for placement in the vehicle 102.

At block 206, the first and the second loudspeakers 120a, 120b are placed in the vehicle 102. For example, the first and the second loudspeakers 120a, 120b may be removed from stowed locations outside of the vehicle 102 and then placed inside the vehicle 102. The first loudspeaker 120a may be placed on a far-left side of the instrument panel and the second loudspeaker 120b may be placed on a far-right side of the instrument panel to create a high-quality stereo image. It is recognized that additional loudspeakers may also be positioned anywhere in the vehicle 102.

At block 208, the system 100 generally enables the occupant to personalize their experience. For example, the occupant may control various parameters of the audio that is transmitted from the first and second loudspeakers 120a, 120b such as, but not limited to, volume, equalization, and/or other effects provided in the app of the mobile device 124. Additionally, the mobile device 124 may also enable voice control of the audio parameters via the mobile device 124 in addition to gesture recognition and subsequent audio control in response to gestures performed by the occupant. Additionally, the mobile device 124 may also interface with audio controls provided by the vehicle 107 to control the audio output thereof for any number of vehicle loudspeakers.

It is recognized that additional loudspeakers 250 may be utilized such as lighted loudspeakers 250 (e.g., lighted loudspeakers that are tethered to the theater 106 or portable in nature that are provided by the occupant) and/or lighting 252 (e.g., lighting that is tethered to the theater 106 or portable in nature that is provided by the occupant). The mobile device 124 may enable intercom capabilities 256 so that the vehicle occupant can interface with any performers on the stage, or respond to inquiries on the screen 108, etc. In this case, after authentication, the server 122 may enable the mobile device 124 to transmit audio from the user to the performers on the stage. In another embodiment, the server 122 may enable the intercom capabilities 256 to allow the vehicle occupant to converse or communicate with other occupants who are attending the event/performance. Additional audio channels of audio 258 may also be utilized other than the left and right channels (or first and second loudspeakers 120a, 120b). Such channels may be provided by the mobile device 124 and/or channels that are provided by the audio system of the vehicle 102. In addition, additional interactive mechanisms 260 may be provided to interact with performs and/or other occupants that attend the performance. In these instances, the user interface on the mobile device 124 may enable occupants to provide responses to inquires via selection on the user interface, etc.

Figure 3:
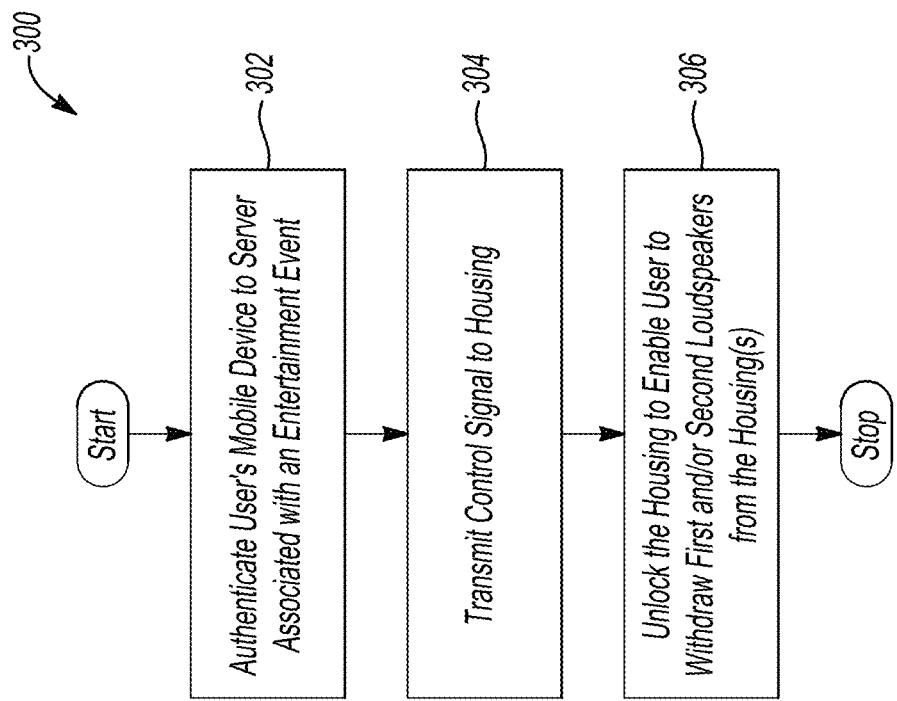
FIG. 3 depicts a method for accessing secured first and second loudspeakers at an entertainment venue in accordance with one embodiment.

FIG. 3 depicts a method 300 for accessing secured first and second loudspeakers 120a, 120b at the entertainment venue 106 in accordance with one embodiment.

In operation 302, the server 122 authenticates the user's mobile device 124 to enable access to the first and the second loudspeakers 120a, 120b. For example, in response to the vehicle occupant purchasing one or more tickets via an interface established by the mobile device 124 and interface with the server 122, the server 122 may issue a passcode or QR code (or any other identifier that is indicative of a successful purchase) to the mobile device 124 of the vehicle occupant. The vehicle occupant may use the passcode, QR code, or electronic identifier to gain access to the first and second loudspeakers 120a, 120b. For example, the user may enter the pass code for transmission to the server 122 to gain admission. Alternatively, the user may display the QR code or other identifiers to the server 112 via the scanner 112 on the computing device 110. Once complete, the server 122 acknowledges that the user's mobile device 124 is authenticated therewith or that the server 122 is paired with the mobile device 124

In operation 304, the server 12 transmits a control signal to the power supply in the housing 105. In operation 306, the power supply activates an actuator (not shown) in the housing 105 to unlock the lock 107 positioned on each corresponding housing 105. In this case, after the housing 105 unlocks, the user may then remove the first loudspeaker 120a and/or the second loudspeaker 120b for the housing 105 (or their corresponding housing 105). The user may then place the first loudspeaker 120a and/or the second loudspeaker 120b in the vehicle 102 to listen to the audio of the performance. In this instance, the user may control the audio characteristics of the audio output provided by the first and the second loudspeakers 120a and 120b. For example, the user may control the volume, equalization, or any number of the audio related properties output by the first and the second loudspeakers 120a, 120b.

Figure 4:
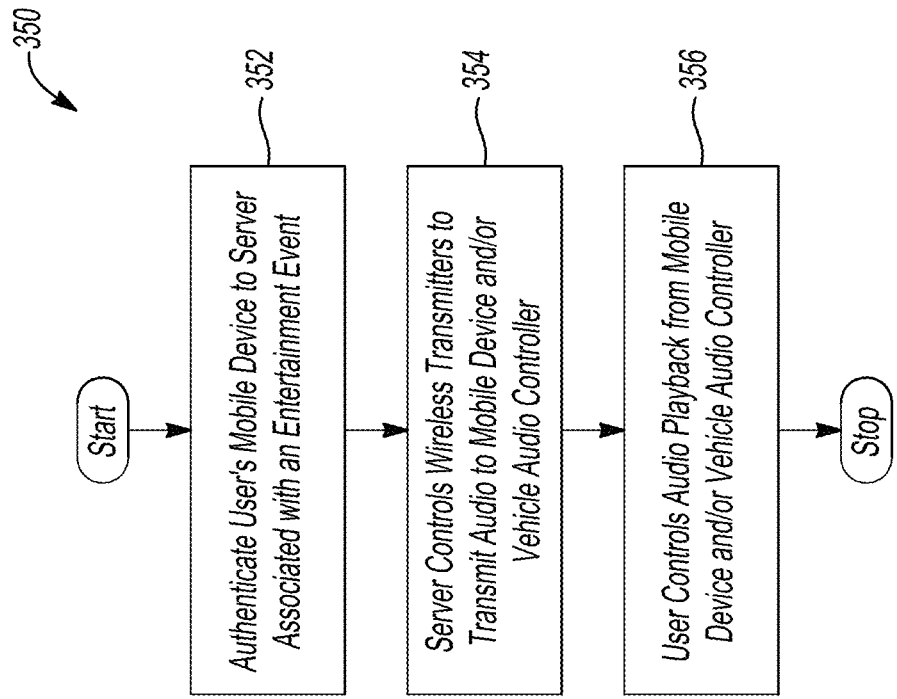
FIG. 4 depicts a method for transmitting audio from wireless transmitters at the entertainment venue to one of a mobile device or a vehicle in accordance with one embodiment.

FIG. 4 depicts a method 350 for transmitting audio from the wireless transmitters 150 at the entertainment venue 106 to one of the mobile device 124 or the vehicle audio controller 109 in the vehicle 102 in accordance with one embodiment.

In operation 352, the server 122 authenticates the user's mobile device 124 to enable access to the first and the second loudspeakers 120a, 120b. As noted above, in response to the vehicle occupant purchasing one or more tickets via an interface established by the mobile device 124 and interfaces with the server 122, the server 122 may issue/transmit a passcode or QR code (or any other identifier that is indicative of a successful purchase) to the mobile device 124 of the vehicle occupant. The vehicle occupant may use the passcode, QR code, or electronic identifier to gain access to the first and second loudspeakers 120a, 120b. For example, the user may enter the pass code for transmission to the server 122 to gain admission. Alternatively, the user may display the QR code or other identifiers to the server 112 via the scanner 112 on the computing device 110. Once complete, the server 122 acknowledges that the user's mobile device 124 is authenticated therewith or that the server 122 is paired with the mobile device 124

In operation 354, the server 122 controls the wireless transmitters 150 to transmit audio pertaining to the entertainment event at the venue 106 to the user's mobile device 124 or to the vehicle audio controller 109 positioned in the vehicle 102. The mobile device 124 via an app may enable the user to select to have the audio transmitted either directly to the mobile device 124 or to the vehicle audio controller 109 for playback via the loudspeaker system in the vehicle 102. The wireless transmitters 150 may wirelessly communicate with the mobile device 124 or the vehicle audio controller 109 via a short-range communication protocol such as Bluetooth or other suitable protocol. The occupant may control the various audio related parameters of the audio provided by the wireless transmitters 150 either through the user interface positioned on the mobile device 124 or directly via through the vehicle audio controller 109 of the vehicle 102. It is recognized that the transmitter 150 may also correspond to a web link or internet link that may be selected by the user via the mobile device 124 to transmit the audio from the entertainment venue 106 to the either the mobile device 124 or the vehicle audio controller 109.

For each of the methods 300 and 350, it is recognized that the mobile device 124 may process captured images, voice control input(s), gesture control, the intercom capabilities 256, and the additional interactive mechanisms 260 and transmit commands or signal indicative of these aspect to the server 122. In response, the server 122 may execute the commands and the actions indicated on the commands where applicable. Similarly, the mobile device 124 may process the captured images, voice control input(s), gesture control and transmit commands or signals indicative of these aspect to the vehicle audio controller 109 when applicable. The mobile device 124 and the vehicle audio controller 109 may communicate with one another via a short-range protocol such as, but not limited to, Bluetooth.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing an immersive audio experience at an entertainment venue, the system comprising:
   at least one loudspeaker attached to the entertainment venue; and
   a server associated with the entertainment venue being programmed to:
   communicate with a mobile device associated with a vehicle occupant;
   enable access to the at least one loudspeaker to position the at least one loudspeaker in a vehicle in response to the mobile device being authenticated with the server;
   receive a request to pair the mobile device with the server; and
   transmit an electronic identifier to the mobile device for display on a user interface thereon.

2. The system of claim 1, wherein the server is further programmed to enable the mobile device to control audio related properties of an audio output signal provided by the at least one loudspeaker.

3. The system of claim 1, wherein the at least one loudspeaker includes a first loudspeaker and a second loudspeaker, and wherein at least one of the first loudspeaker and the second loudspeaker is a tactile transducer.

4. The system of claim 3, wherein the first loudspeaker and the second loudspeaker provide a stereo audio output signal in the vehicle after the mobile device is authenticated with the server.

5. The system of claim 1, further comprising a computing device programmed to capture an image of the electronic identifier on the mobile device and to transmit a signal indicative of the captured image of the electronic identifier to the server to authenticate the server to the mobile device.

6. The system of claim 1, wherein the at least one loudspeaker is attached to a housing having a lock at the entertainment venue.

7. The system of claim 6, wherein the server transmits a control signal to the housing to unlock the lock to enable a user to remove the at least one loudspeaker from the housing and to place the at least one loudspeaker in the vehicle to provide an audio output signal.

8. The system of claim 1, wherein the server is further programmed to receive one or more signals to control audio related properties of the at least one loudspeaker that correspond to one of captured gestured movements and captured voice inputs at the mobile device.

9. A system for providing an immersive audio experience at an entertainment venue, the system comprising:
    a first loudspeaker and a second loudspeaker attached to the entertainment venue; and
    a server associated with the entertainment venue being programmed to:
        communicate with a mobile device associated with a vehicle occupant; and
        enable access to the first loudspeaker and the second loudspeaker to position the first loudspeaker and the second loudspeaker in a vehicle in response to the mobile device being paired with the server,
    wherein the first loudspeaker and the second loudspeaker are attached to at least one housing having a lock at the entertainment venue, and
    wherein the server is further programmed to transmit a control signal to the at least one housing to unlock the lock to enable a user to remove the first loudspeaker and the second loudspeaker from the at least one housing and to place the first loudspeaker and the second loudspeaker in the vehicle to provide an audio output signal.

10. The system of claim 9, wherein the server is further programmed to enable the mobile device to control audio related properties of an audio output signal provided by the first loudspeaker and the second loudspeaker.

11. The system of claim 9, wherein the first loudspeaker and the second loudspeaker provide a stereo audio output signal in the vehicle after the mobile device is authenticated with the server.

12. The system of claim 9, wherein the server is further programmed to receive a request to pair the mobile device with the server.

13. The system of claim 12, wherein the server is further programmed to transmit an electronic identifier to the mobile device for display on a user interface thereon.

14. The system of claim 13, further comprising a computing device programmed to capture an image of the electronic identifier on the mobile device and to transmit a signal indicative of the captured image of the electronic identifier to the server to authenticate the server to the mobile device.

15. The system of claim 9, wherein the server is further programmed to receive one or more signals to control audio related properties of the first loudspeaker and the second loudspeaker that correspond to one of captured gestured movements and captured voice inputs at the mobile device.

16. A system for providing an immersive audio experience at an entertainment venue, the system comprising:
    at least one loudspeaker attached to the entertainment venue; and
    a server associated with the entertainment venue being programmed to:
        communicate with a mobile device associated with a vehicle occupant;
        enable access to the at least one loudspeaker to position the at least one loudspeaker in a vehicle in response to the mobile device being authenticated with the server,
    wherein the at least one loudspeaker is attached to a housing having a lock at the entertainment venue, and
    wherein the server is further programmed to transmit a control signal to the housing to unlock the lock to enable a user to remove the at least one loudspeaker from the housing and to place the at least one loudspeaker in the vehicle to provide an audio output signal.

17. A system for providing an immersive audio experience at an entertainment venue, the system comprising:
    at least one loudspeaker attached to the entertainment venue; and
    a server associated with the entertainment venue being programmed to:
        communicate with a mobile device associated with a vehicle occupant;
        enable access to the at least one loudspeaker to position the at least one loudspeaker in a vehicle in response to the mobile device being authenticated with the server; and
        receive one or more signals to control audio related properties of the at least one loudspeaker that correspond to one of captured gestured movements and captured voice inputs at the mobile device.

\* \* \* \* \*